Sept. 8, 1936.    M. OLLEY    2,053,575

MOTOR VEHICLE

Filed June 14, 1934

Inventor
Maurice Olley
By Blackmore, Spencer & Flint
Attorneys

Patented Sept. 8, 1936

2,053,575

UNITED STATES PATENT OFFICE 2,053,575

MOTOR VEHICLE

Maurice Olley, Detroit, Mich., assignor to General Motors Corporation, Detroit, Mich., a corporation of Delaware Application June 14, 1934, Serial No. 730,620

4 Claims. (Cl. 180—64)

Violent shaking and shuddering at the front end of most motor vehicles occurs at certain driving speeds, particularly in the higher range. The reason seems to be that the natural vibration period of the front end construction is low enough that road vibrations of the wheels induce a torsional vibration of the assembly which sometimes is referred to aptly as fender flap.

Considering conventional motor vehicle construction, the chassis frame which is spring supported upon the wheels carries at its front end the front of the engine, the radiator and fenders, so that the frame is stiffened and its moment of inertia materially increased. This is particularly true when the engine is rigidly connected to the frame. An engine rigidly bolted down acts as a frame reinforcement stiffening the frame and increasing the frequency of its natural periodicity. The greater inertia of the engine mass is tending to decrease this periodicity, but the net result generally is a slight increase in frequency. For insulation purposes the recent practice has been to resiliently mount the engine through soft rubber connections which decreases frame reinforcement without, however, lowering the moment of inertia. Here the inertia effect may outweigh the stiffening effect with an actual decrease in frame frequency. The natural periodicity of the frame being retarded, the assembly will vibrate torsionally at a speed low enough to be excited by road vibrations of the wheels.

In order that the periodicity of the frame may be made more rapid so as to fall above the speed of road vibrations, it is here proposed to change the moment of inertia of the forward end of the frame by divorcing the engine from the frame at the front, on the theory that the lower the inertia of a body the higher its natural periodicity.

To accomplish this end the engine is supported rigidly on the rigid portion of the frame or that portion back of the body dash and is supported flexibly on the forward or more flexible portion of the frame. In this manner engine weight does not increase the moment of inertia and the periodicity of the flexible portion of the frame forward of the body dash or, in other words, the frame period remains substantially unaffected and higher than the frequency of road vibrations. Insofar as the front end of the frame is concerned the engine has no moment and torsional oscillation of the frame will produce no torsional oscillation of the engine.

Figure 1:
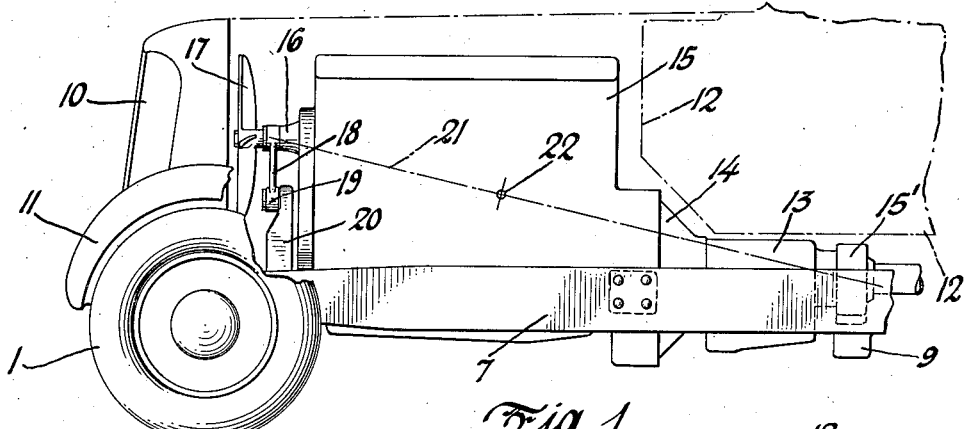
Figure 2:
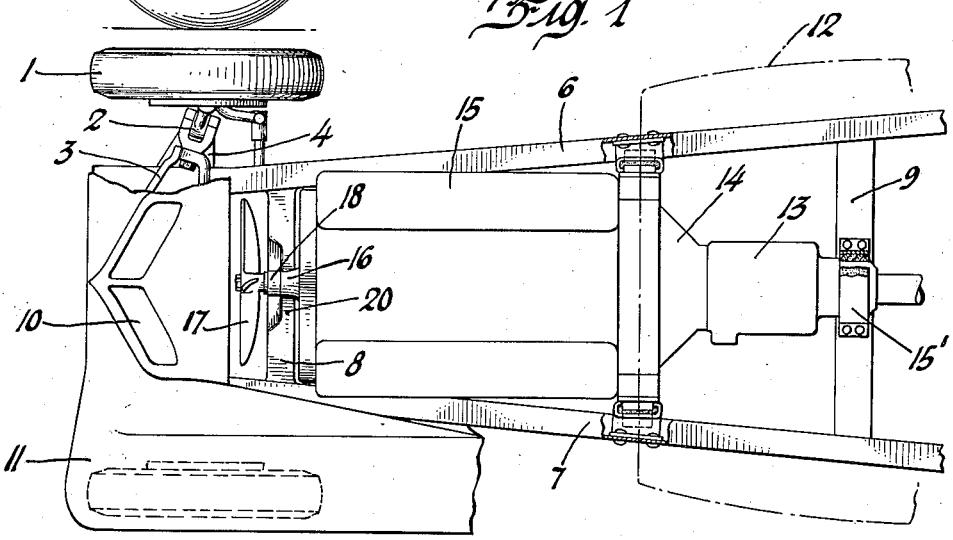
Figure 3:
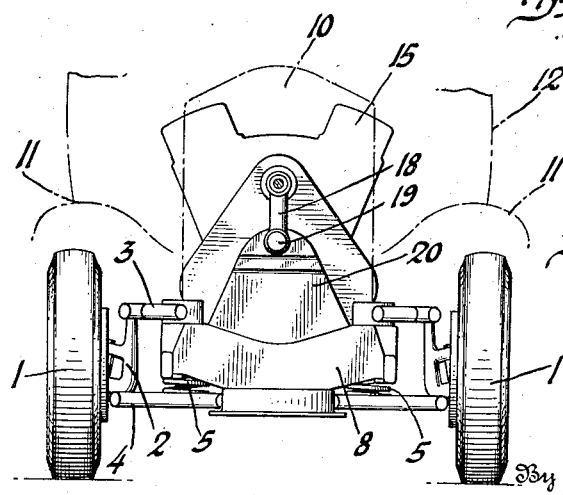

The invention will be understood best by reference to the accompanying drawing, wherein Figure 1 is a side elevation; Figure 2 is a top plan view, and Figure 3 is an end view of the front portion of an automobile with parts broken away and illustrating a preferred embodiment.

In the drawing a pair of dirigible road wheels 1—1 carry the vehicle chassis frame through a suitable spring arrangement. The independent spring suspension illustrated corresponds to that used on the 1934 Cadillac automobile and it may be said, incidentally, that the chassis frame for use with an independent wheel suspension system is designed so as to be considerably stiffer than a frame intended for use with an axle and leaf spring type of suspension. Describing briefly the illustrated spring suspension, there is involved at each side of the frame a wheel spindle carrying member 2, pivotally connected at top and bottom to a pair of vertically spaced forked levers 3 and 4, which at their inner ends are hinged to the frame with a coil spring 5 seating at opposite ends on the bottom of the frame and top of the lower lever. The link arrangement permits a vertical movement of the wheel against the resistance of the spring. Steering is accomplished by mechanism which connects the wheel spindles for swinging movement in unison.

The chassis frame includes a pair of longitudinal side members 6 and 7 and transverse connecting members 8 and 9, and at the front of the frame are mounted the radiator assembly 10 and the fenders or mud guards 11 projecting outwardly over the wheels. Rearwardly of the radiator is the space for the engine and beyond the engine space the chassis frame has mounted thereon the body or load carrying compartment, all according to well recognized practice. As is well understood, the body and the frame serve to mutually reinforce each other and the frame is substantially inflexible from just forward of the body dash rearwardly.

As shown in the drawing, the body, a portion of which is illustrated by broken lines at 12, overhangs the rear of the engine or power plant, including the transmission housing 13 and the clutch and flywheel housing 14, both of which are rigid with the engine block 15 to provide a unit assembly. At each side of the flywheel housing 14 and at the rear of the transmission housing 13 is a weight supporting connection with the chassis frame so that the major portion of the engine weight is taken by the two intermediate supports and the rear support directly into the rigid portion of the chassis frame. These mountings may be rigid connections but for the sake of insulation it will be preferable to use mounting units which include rubber or other non-metallic material. The rear mounting may comprise, for example, a rubber ring interposed between a tubular extension on the transmission housing and a circular bracket 15' bolted to the frame member 9, and each side mounting may consist of a rubber pad wrapped around a downwardly inclined flat foot of one bracket and within an elongated opening in another bracket with one bracket fastened to the frame and the other to the engine.

At the front of the engine is a forwardly extending tubular projection 16 enclosing a shaft for the radiator fan 17 and, as shown in the drawing, this provides a trunnion bearing for the upper end of a compression link 18 pivoted for sidewise swinging movement at its opposite end on a trunnion 19 supported on a tower or standard 20 which forms a part of the transverse frame member 8. Metal bearings are contemplated for the pivotal connections although torsional rubber joints could be used. Thus the swinging link is pivoted to the engine and frame, respectively, on vertically spaced longitudinally extending axes and the tie connection afforded rigidly resists relative movement, both vertically and longitudinally with substantially no resistance to any tendency toward transverse movement. The operation and effect would be the same if the swinging link were of the suspension type, but the structure would differ in that a higher cross member might be required. However, the compression link is entirely satisfactory and it is held against turning over center by reason of the rear supportt.

It will be noted that the pivot at the upper end of the link is illustrated as being substantially on a line 21 which intersects the center of gravity 22 of the power plant unit and the axis of the engine crank shaft at the rear of the transmission where the rear support is located. This is for the purpose of stabilization as regards the transmission to the frame of vibrations produced by an engine which is rough in operation, inasmuch as the least moment of the engine lies about this axis. For an engine which is inherently smooth in operation, the location of the front mount with reference to the polar axis is unimportant so long as its construction and arrangement is such as to permit freely both lateral and pivotal motion, in which case the normal periodicity of the front end of the frame is increased, due to the decreased inertia at this point which results in the elimination of fender flapping and torsional flexing of the frame.

I claim:

1. A motor vehicle having a frame, an engine, a frame attachment at one end of the engine, a pair of transversely spaced frame attachments intermediate the ends of the engine cooperating with the first mentioned attachment to hold the engine substantially fixed in the frame, and a swinging link pivotally connected at vertically spaced points to the engine and frame respectively to restrain relative vertical and longitudinal movements and accommodate transverse movement.

2. In a motor vehicle, a chassis frame, an engine assembly, resilient mounting means for holding the rear of the engine assembly against movement of translation, while allowing oscillation about a longitudinal axis intersecting the center of gravity of the assembly, and a swinging link pivoted at one end to the front of the engine assembly on said axis and pivoted at its opposite end to the frame on a longitudinally extending axis vertically spaced from the first axis.

3. In a motor vehicle, having a chassis frame, an engine unit to be mounted in the forward portion of the frame, supporting means toward the rear of the engine carrying the major portion of the gravity load of the engine and holding the engine substantially rigid in relation to the adjacent portion of the frame, and a tie connection between the front of the engine and the frame comprising a rigid link pivotally connected with the engine and frame on longitudinally extending axes arranged in vertically spaced parallelism and in the vertical plane containing the longitudinal center line of the frame.

4. In a motor vehicle, the combination of an engine and a frame, spring supported at the front upon road wheels, of means connecting the engine and the frame in longitudinal spaced relation with said wheels, affording a cantilever mounting of the engine in the frame, and a shackle pivotally mounted on longitudinally extending vertically spaced axes to the frame and the front of the engine, respectively.

MAURICE OLLEY.